United States Patent [19]

LaPaglia

[11] 4,348,951
[45] Sep. 14, 1982

[54] COTTAGE CHEESE PROCESSOR

[76] Inventor: Angelo F. LaPaglia, 7700 W. Bargain Rd., Erie, Pa. 16509

[21] Appl. No.: 205,883

[22] Filed: Nov. 10, 1980

[51] Int. Cl.³ .............................................. B30B 9/06
[52] U.S. Cl. ................................... 100/127; 100/264; 100/265; 100/289
[58] Field of Search ............... 100/244, 264, 265, 268, 100/110, 116, 126, 127, 128, 129, 289, 131, 254, 259, 260, 251

[56] References Cited

U.S. PATENT DOCUMENTS

| | | | |
|---|---|---|---|
| 82,174 | 9/1868 | Stratton | 100/264 |
| 411,467 | 9/1889 | McPherson | 100/264 |
| 731,482 | 6/1903 | Marsh | 100/289 X |
| 924,122 | 6/1909 | Williams | 100/289 |
| 1,332,644 | 3/1920 | Turner | 100/295 X |
| 1,332,649 | 3/1920 | Turner | 100/295 X |
| 1,738,326 | 12/1929 | Smith | 100/116 X |
| 2,057,466 | 10/1936 | Willetts | 100/289 X |
| 2,621,589 | 12/1952 | Dubois | 100/251 |
| 2,877,531 | 3/1959 | Heine | 100/264 X |
| 2,979,770 | 4/1961 | Greene | 100/264 X |

FOREIGN PATENT DOCUMENTS

| | | | |
|---|---|---|---|
| 79168 | 6/1950 | Czechoslovakia | 100/289 |
| 946883 | 8/1956 | Fed. Rep. of Germany | 100/265 |
| 1242292 | 8/1971 | United Kingdom | 100/289 |

*Primary Examiner*—Billy J. Wilhite
*Attorney, Agent, or Firm*—Charles L. Lovercheck; Wayne L. Lovercheck; Dale R. Lovercheck

[57] ABSTRACT

A cheese press having a platen is disclosed. The platen is supported by springs that are held in prestressed condition by stops so that the springs will deflect when a pressure of predetermined amount is exerted on the cheese, thus limiting the pressure on the springs to a predetermined amount depending on the strength of the springs selected. The springs can be changed to weaker or stronger springs, depending on the pressure desired.

4 Claims, 4 Drawing Figures

U.S. Patent
Sep. 14, 1982
4,348,951
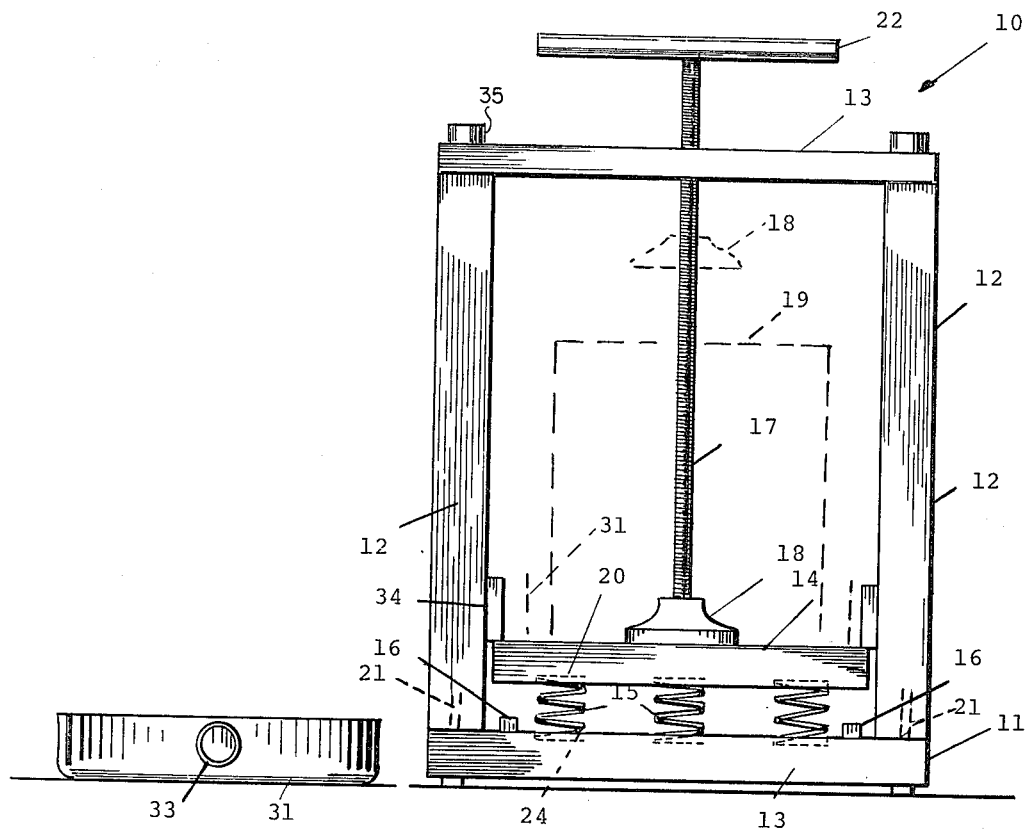
FIG. 4
FIG. 1
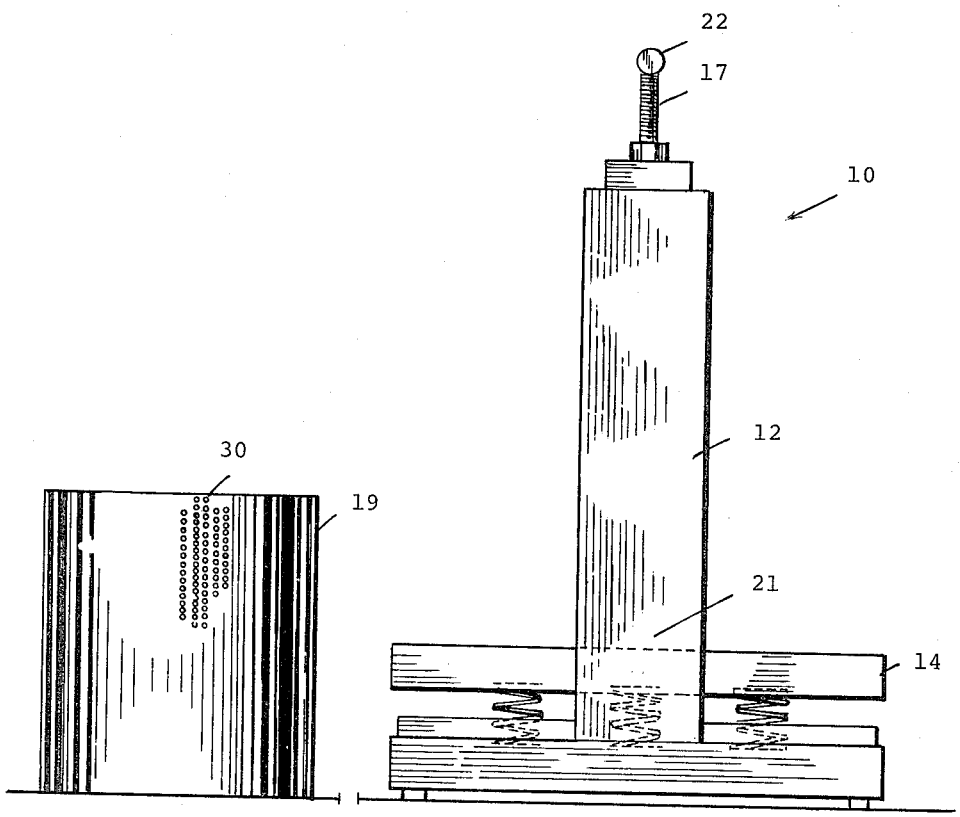
FIG. 3
FIG. 2

COTTAGE CHEESE PROCESSOR

GENERAL STATEMENT OF INVENTION

In the manufacture of cheese, it is most important for the cheese to be pressed with the correct amount of pressure to result in the desired product.

Applicant has provided a cheese press by which a predetermined amount of pressure may be applied which supports a colander on springs, and the colendar may contain cheese. When the top platen is depressed on the cheese, the springs will be deflected in an amount in proportion to the pressure exerted on the cheese. The bottom platen is held in position by the stops so that the springs are pre-stressed to the pressure desired. The strength of the springs can be selected so that a known pressure on the platen will deflect them and consequently a known pressure on the cheese is necessary to move the platen away from the stops. If more pressure is required, the stronger springs may be used.

Thus, by applying only enough pressure to the cheese to move the bottom platen away from the stops, a known pressure will be applied to the cheese.

REFERENCE TO PRIOR ART

None of the cheese presses shown in the following patents show a press that has the important feature of the press herein.

| | | |
|---|---|---|
| 82,174 | 1,332,644 | 2,877,531 |
| 411,467 | 1,332,649 | 2,979,770 |
| 731,482 | 2,621,589 | |

OBJECTS OF THE INVENTION

It is an object of the invention to provide an improved cheese press.

Another object of the invention is to provide a cheese press that is simple in construction, economical to manufacture and simple and efficient to use.

Another object of the invention is to provide an improved press.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a front view of the cheese press according to the invention.
FIG. 2 is a side view of the cheese press.
FIG. 3 is a partial view of a colander.
FIG. 4 is a container for use with the colander.

DETAILED DESCRIPTION OF THE DRAWINGS

Now, with more particular reference to the drawings, a cheese press indicated generally at 10 has a base 11, pair of spaced uprights 12 and a cross member 13 are fixed together forming a rigid assembly, a platen 14 supported by the compression springs 15 of the base 11 and on the lower side of the platen 14 and held rigidly together by rods 20 having nuts 35 on their lower ends. Stops 16 limit the downward movement of the platen and stops limit the upward movement of the platen.

The plunger 18 is supported on the screw 17 which passes through a threaded hole in cross member 13 which is rigidly supported on the upper end of the uprights 12. The base 11 is adapted to be supported on a supporting surface such as a table, and the uprights 12 are spaced from each other and rest on the base 11 and extend upwardly from the base 11. The screw is threadably received in the cross member 13 and may have a suitable type of thread familiar to those skilled in the art. The handle 22 is attached to the upper end of the screw and springs 15 rest in recesses 20 in the base 11 and recesses 24 in base 11 can be replaced by springs of a different tension to control pressure on the cheese in colander 19 supported on the platen 14.

The ends of springs 15 are received in recesses 20 in the bottom of platen 14 and in the top of base 11. Plunger 18 is attached to screw 17, and it may engage cheese received in a colander 19. The upward and downward movement of platen 14 is limited by stops 16 and stops 32 which are fixed to uprights 12.

The springs can be easily replaced with stronger or weaker springs to vary the pressure on the cheese in colander 19.

Colander 19 has holes 30 distributed over its entire outside surface which allow liquid from the cheese under pressure to flow down into pan 31 and out through spout 33. A suitable colander 19 is supported on platen 14 as shown by dotted lines in FIGS. 1 and 2, and colander 19 is supported in a pan 31. Plumger 18 is moved to position above the colander 19 and 19, and the colander is filled with cheese. Then plunger 18 is moved down until springs 15 are compressed and platen 14 is moved away from stops 34. Then the pressure on the cheese is limited by springs 15. If more pressure is desired, stronger springs may be used. Additional pressure may also be obtained by tightening screw 17 until platen 14 engages stops 16.

The foregoing specification sets forth the invention in its preferred, practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. A cheese press comprising a base 11, spaced uprights 12 attached to the base 11, and extending upwardly therefrom, a cross member 13 attached to the uprights,
   and a platen 14 between said uprights and above said base,
   an upper stop 34 on each of the uprights above said platen limiting the upward movement of the platen and a lower stop adjacent each of the uprights spaced from said upper stops limiting the downward movement of the platen,
   a screw 17 extending through said cross member and a plunger attached to said screw,
   said base being adapted to be supported on a supporting surface,
   a colander on said platen for receiving cheese material adapted to receive said plunger whereby liquid can be squeezed from said cheese, springs on said base supporting said platen urging said platen into engagement with said upper stops, the pressure on cheese by said plunger being adapted to compress said springs forcing said platen away from said upper stops whereby the pressure on said cheese is limited.

2. The press recited in claim 1 wherein the cross member is supported on said upright members and said springs rest in recesses in said base.

3. The cheese press recited in claim 2 wherein the screw is threadably received in the cross member.

4. The cheese press recited in claim 3 wherein a handle 22 is attached to the upper end of the screw to rotate said screw whereby pressure is exerted on cheese material in said colander.

* * * * *